United States Patent [19]

Jaeger et al.

[11] Patent Number: 5,324,500

[45] Date of Patent: * Jun. 28, 1994

[54] METHOD FOR PROCESSING RESIDUES OF BARIUM SULFIDE OR STRONTIUM SULFIDE LEACHING

[75] Inventors: Paul Jaeger; Heinz-Hermann Riechers, both of Bad Hoenningen; Karl Koehler, Diekholzen; Martin Wulff, Bad Hoenningen, all of Fed. Rep. of Germany

[73] Assignee: Solvay Barium Strontium GmbH, Hanover, Fed. Rep. of Germany

[ * ] Notice: The portion of the term of this patent subsequent to May 17, 2011 has been disclaimed.

[21] Appl. No.: 941,571

[22] Filed: Sep. 9, 1992

[30] Foreign Application Priority Data

Sep. 14, 1991 [DE] Fed. Rep. of Germany ....... 4130676

[51] Int. Cl.$^5$ .............................................. C01B 17/96
[52] U.S. Cl. .................... 423/544; 423/166; 423/158; 423/549; 423/554; 423/150.1; 423/150.3; 423/147; 423/332
[58] Field of Search .............. 423/544, 547, 549, 554, 423/157.3, 157.4, 158, 166, 164, 147, 150.1, 150.3, 332

[56] References Cited

U.S. PATENT DOCUMENTS

| | | | |
|---|---|---|---|
| 1,458,461 | 6/1923 | Ayers | 23/122 |
| 2,005,296 | 6/1935 | Mueller et al. | 23/122 |
| 2,039,432 | 5/1936 | McCallum | 23/122 |
| 2,052,436 | 8/1936 | Wysor | 23/122 |
| 2,285,242 | 6/1942 | Weber et al. | 23/122 |
| 2,573,616 | 10/1951 | Séailles | 423/164 |
| 3,809,742 | 5/1974 | Simoleit et al. | 423/155 |
| 3,935,100 | 1/1976 | Alagy et al. | 210/45 |

FOREIGN PATENT DOCUMENTS

| | | | |
|---|---|---|---|
| 0459348 | 12/1991 | European Pat. Off. | 423/554 |
| 1069597 | 11/1959 | Fed. Rep. of Germany . | |
| 3213517 | 10/1983 | Fed. Rep. of Germany | 423/549 |
| 3723320 | 1/1989 | Fed. Rep. of Germany | 423/166 |
| 3706533 | 5/1989 | Fed. Rep. of Germany . | |
| 58-120520 | 7/1983 | Japan | 423/554 |

OTHER PUBLICATIONS

Chemical Abstracts, vol. 104, No. 6, Abstract No. 36324P (1986) Feb.
Chemical Abstracts, vol. 79, No. 12, Abstract No. 68257A (1973) Sep.
Projekttraegerschaft Abfallwirtschaft und Altlastensanierung published by the German Federal Ministry for Research and Technology, p. 283 (Jan. 1989).

*Primary Examiner*—Gary P. Straub
*Assistant Examiner*—Timothy C. Vanoy
*Attorney, Agent, or Firm*—Evenson, McKeown, Edwards & Lenahan

[57] ABSTRACT

A method for treating residues of barium sulfide or strontium sulfide leaching with waste sulfuric acid and hydrochloric acid, which method significantly decreases the amount of residual material which must be disposed of.

13 Claims, No Drawings

METHOD FOR PROCESSING RESIDUES OF BARIUM SULFIDE OR STRONTIUM SULFIDE LEACHING

BACKGROUND OF THE INVENTION

This invention relates to a method for processing residues of barium sulfide leaching or strontium sulfide leaching.

Barium sulfide leaching is a step in the process for producing barium compounds from the naturally occurring starting material, namely heavy spar (baryta). Heavy spar contains about 92 to 98% by weight of barium sulfate, varying amounts of calcium salts and iron salts, as well as silicate. Ground heavy spar is mixed with finely ground charcoal and reduced at high temperatures (approximately 1200° C.) to barium sulfide. The cooled melt containing barium sulfide is extracted with hot water to form barium sulfide lye. The barium sulfide lye obtained by this barium sulfide leaching is an intermediate in the manufacture of many different organic and inorganic barium compounds. To form these compounds the lye is further reacted. For example, barium carbonate, which is used in the glass industry, can be prepared by introducing carbon dioxide.

Leaching of barium sulfide leaves a residue which contains mostly barium salts plus iron and calcium salts. The iron and calcium salts are especially in the form of the silicates and sulfides.

The preparation of strontium compounds is comparable to the preparation of barium compounds from barium sulfate. The starting material in this case is the naturally occurring mineral celestine, which consists primarily of strontium sulfate. The production of strontium compounds from this mineral is similar to the above-described production of barium compounds. The ground celestite is mixed with charcoal, reduced at high temperatures to strontium sulfide, and the cooled melt is extracted with hot water to form a strontium sulfide lye. This strontium sulfide lye obtained by leaching strontium sulfide is an intermediate in the preparation of a great number of strontium compounds. The far greatest part of this lye is further reacted to strontium carbonate, for example by introducing carbon dioxide. Strontium carbonate is used on a large scale in making television picture tubes. The leaching of strontium sulfide also leaves a residue.

SUMMARY OF THE INVENTION

The object of the invention is to provide a new method for processing residues of barium sulfide leaching or strontium sulfide leaching.

A further object of the invention is to provide a method of processing residues from barium sulfide leaching or strontium sulfide leaching which is simple and applicable on a large industrial scale.

Another object of the invention is to provide a method of processing residues from barium sulfide leaching or strontium sulfide leaching which will facilitate partial or complete utilization of these residues and decrease the amount of residue to be disposed of.

These and other objects of the invention are achieved by providing a method for processing residues of barium sulfide leaching or strontium sulfide leaching, comprising reacting the residues with hydrochloric acid and sulfuric acid to form an acid solution and a solid, and separating the acid solution from the solid, wherein a waste sulfuric acid or a sulfuric acid obtained by the treatment of exhaust gases containing $SO_2$ and/or $H_2S$ is used as the sulfuric acid.

DETAILED DESCRIPTION OF PREFERRED EMBODIMENTS

The method of the invention for processing residues of barium sulfide leaching or strontium sulfide leaching, in which the residues are reacted with sulfuric acid to form an acid solution and a solid, and the acid solution is separated from the solid, is characterized by the fact that a waste sulfuric acid, or a sulfuric acid obtained by the processing of exhaust gases containing sulfur dioxide and/or hydrogen sulfide, is used as the sulfuric acid.

Sulfuric acid is used on a large scale for a great number of purposes in the chemical industry. Sulfuric acid is used, for example, as a reactant (e.g., in the sulfonation of aromatic compounds), as a drying agent (e.g., the drying of chlorine), as a catalyst (e.g., in the nitration of aromatic compounds), for taking up water of reaction (e.g., in condensation reactions), as a means of purification (e.g., of acetylene or in the acid refinement of lubricating oils), or in digestion processes (e.g., in pigment production). In these and other processes waste sulfuric acid is produced. Such waste sulfuric acids, which in some cases may also contain dissolved salts, can, according to one variant, be used in the method of the invention. Often waste sulfuric acids exist in more or less diluted form, containing, e.g., 10 to 80% of $H_2SO_4$ by weight. The sulfuric acids can, if desired, be used in the method of the invention in the concentration in which they occur in the process that creates them. If desired, however, they can be concentrated, e.g., to a minimum content of 40 weight-percent $H_2SO_4$.

The above-described embodiment of the method of the invention solves both the problem of making rational use of leaching residues and the problem of making rational use of waste sulfuric acid produced in chemical processes. A preferred embodiment of the method of the invention relates to the use of a sulfuric acid obtained by processing waste gases containing $SO_2$ and/or $H_2S$. Waste gases which contain sulfur dioxide and/or hydrogen sulfide are produced in a number of chemical processes, e.g., in waste gases from sulfide roasting, in waste gases from sulfide leaching, in waste gases from Claus apparatus, and in furnace exhausts. In the method according to the invention it is especially preferred to use sulfuric acid which has been obtained by the processing of such waste gases. The processing of such waste gases is known. Hydrogen sulfide that may be present in the exhaust gases is first oxidized to sulfur dioxide. The sulfur dioxide contained in the exhaust gases is catalytically oxidized, usually by contact with vanadium pentoxide, and the resulting sulfur trioxide is then finally converted to sulfuric acid, e.g., by washing it out with water. Thus "wash acid" is formed.

Sulfuric acid which has been obtained by processing exhaust gases from Claus apparatus, which contain $SO_2$ and/or $H_2S$, is very especially preferred in the method of the invention. The Claus process serves for producing elemental sulfur from hydrogen sulfide. In this process gases containing hydrogen sulfide and oxygen, e.g., air containing hydrogen sulfide, are passed over a catalyst in two stages. This ultimately results in the formation of elemental sulfur and water. The reaction usually is not quantitative. Exhaust gases are formed which are referred to hereinafter as "Claus exhaust gases," which still contain sulfur dioxide and/or hydrogen sulfide. As stated, sulfuric acid from the processing of such "Claus exhaust gases" is used to very special advantage in the method of the invention. The concentration of the sulfuric acid from the processing of "Claus exhaust gases" can vary widely. In principle, the sulfuric acid can be used here too in the concentration in which it occurs in the process. Advantageously, however, the sulfuric acid should contain at least 40% by weight sulfuric acid. The sulfuric acid preferably amounts to from 50 to 100% by weight. If desired, the sulfuric acid can be concentrated or diluted.

The hydrochloric acid advantageously should contain at least 15% by weight HCl. Hydrochloric acid containing from 20 to 32% by weight HCl is especially preferred.

The sulfuric acid or hydrochloric acid could also be used in a concentration lower than 40 and 15 wt.-%, respectively. However, too high of a water content in the reaction mixture is not desirable.

The reaction of the leaching residues with the acids is advantageously performed at a temperature of at least 50° C. It is preferable to operate at between 60° C. and the boiling temperature, but very especially preferred between 65° C. and 100° C. One can also operate at a lower temperature, but the reaction times are longer. It is possible to operate at a temperature higher than boiling, but it is generally uneconomical. In addition to the thermal energy that may be released by an exothermic reaction, the reaction mixture can be appropriately heated.

The separated solids can be treated with alkali if desired. The acid solution and the solids can be neutralized if desired, and dewatered if desired.

The addition of hydrochloric acid and sulfuric acid to the leaching residues can be performed simultaneously. In that case a hydrochloric acid containing sulfuric acid can be added. Preferably, however, the residues are first reacted with hydrochloric acid, and afterward the sulfuric acid is added.

The sulfuric or the hydrochloric acid can contain salts if desired. Also, a portion, e.g., up to 20%, of the sulfuric or hydrochloric acid can be replaced by sulfate or hydrogen sulfate salts or chlorides, especially of alkali metals. Preferably the addition of such salts is omitted.

The sulfate or sulfuric acid, as the case may be, is advantageously supplied in at least the amount necessary to completely precipitate the barium or strontium contained in the residue, in the form of barium sulfate or strontium sulfate. Lesser amounts of sulfate or sulfuric acid can also be added, but the effectiveness of the method of the invention is then diminished.

Sulfate or sulfuric acid can also be introduced in amounts greater than are stoichiometrically necessary for the barium or strontium precipitation. Particularly good results are obtained if sulfuric acid is added in an amount that is 1.02 to 1.1 times the stoichiometrically required amount.

The hydrochloric acid is advantageously metered in at least the amount stoichiometrically required to dissolve the calcium and iron contained in the residue. The effectiveness is reduced if less than stoichiometric amounts of hydrochloric acid are used. The hydrochloric acid, however, can be used in greater than stoichiometric amounts. Particularly good results are obtained if the hydrochloric acid is introduced in an amount that is 1.01 to 1.1 times the amount stoichiometrically required for dissolving the calcium and iron content in the residue.

Advantageously, the reaction components are thoroughly mixed.

The leaching residue is preferably reacted with the hydrochloric acid and the preferably utilized aqueous sulfuric acid at temperatures from 65° C. to 100° C. In addition to the thermal energy released by an exothermic reaction, the reaction mixture can be appropriately heated.

The duration of the reactions between the leaching residue and hydrochloric acid or sulfuric acid can vary widely. Good results are achieved if the reaction is performed for a period totalling 15 minutes to 3 hours. The reaction can, of course, be performed for a shorter or longer time of up to 24 hours or more.

For reasons relating to the apparatus it is preferable to operate at standard pressure (ambient pressure). However, if suitable apparatus is used, a lower or a higher pressure can be employed.

Hydrogen sulfide released in the reaction of the leaching residue with acid, the release of which can be further increased by stripping, is removed and can be processed, for example, to sulfur.

In the reaction, an acid solution and a solid are formed in the reactor. After the reaction of the leaching residue with hydrochloric acid and sulfuric acid, the acid solution is separated from the solid. Known methods can be used for this purpose, e.g, filtration, centrifugation or decantation.

The separated solid, which also can be washed with water, consists, in the case of application to barium sulfide leaching residue, substantially of barium sulfate and silicon dioxide. It can be used moist from the filter or it can be dried, if desired. In particular, it can be recycled to the barium sulfate reduction. According to a variant described hereinafter, it can also be further processed.

In the application to strontium sulfide leaching residue, the solid consists essentially of strontium sulfate. This residue can also be recycled to the sulfate reduction or further processed.

The aqueous acid solution contains essentially the iron and calcium components of the leaching residue. Due to the use of hydrochloric acid, an aqueous solution of iron chloride and calcium chloride as well as the corresponding sulfates is obtained. The mixture of iron chloride and calcium chloride which remains after optionally concentrating or drying the solution or after separating the acid, can be used as a flocculating agent or as a precipitating agent, for phosphates for example, in the treatment of waste water.

In one preferred embodiment of the method of the invention, the solid that forms in the acid treatment, which consists essentially of barium sulfate or strontium sulfate and silicon dioxide, is further treated. For this purpose the solid is decomposed with aqueous alkali solution, and soluble components are dissolved. An alkaline extract solution and an extraction residue are formed.

This embodiment is characterized in that the solid separated from the acid solution is decomposed with aqueous alkali solution with the formation of an alkaline extract solution and an extraction residue, and the alkaline extraction solution is separated from the extraction residue.

The concentration of the alkali solution used can vary widely, e.g., between 1% by weight and the saturation limit. However, it is advantageously between about 15 and 50 wt.-%. Caustic soda solution is particularly suitable.

The reaction of the solid with alkali solution in the decomposition can be performed at temperatures between about 10° C. and the boiling point. It is preferably performed, however, above about 50° C. and particularly preferably between about 80° C. and the boiling point of the reaction mixture.

Leaching with alkali solution can be performed at standard pressure (1 atm). If desired, an elevated pressure can be used, for example a pressure up to 5 bar, and a temperature of up to 160° C. or higher. In that case pressure-resistant apparatus (autoclaves) are used. If suitable apparatus is used, it is also possible to operate at even higher pressures than 5 bar and higher temperatures than 160° C.

After the reaction the alkaline extract solution contains the silicon dioxide in the form of dissolved sodium silicate. The alkaline solution is separated by known methods, for example by filtration, centrifugation or decantation, from the alkali-insoluble solid which consists primarily of barium sulfate or strontium sulfate.

The alkaline solution containing alkali silicate can be used as a water glass solution or, optionally after drying, for producing silica gel. The alkali-insoluble solid can be recycled, optionally after drying, to the sulfate reduction.

This variant of the method of the invention thus makes it possible to fully utilize the residue of barium sulfide leaching or the residue of strontium sulfide leaching.

If there is no need to utilize the iron- and calcium-containing acid solution or the alkali silicate solution, the solution in question can, of course, also be neutralized, dried to a greater or lesser extent, and the resulting residue can be delivered to a dump.

If there is no interest in utilizing the iron- and calcium-containing acid solution or in the utilization of the alkali silicate solution, the two solutions are advantageously combined. If desired, they are neutralized and the resulting residue delivered to a dump. The residue can be dumped either filter-moist or more or less dry.

An especially advantageous embodiment of the method of the invention is characterized by using a hydrochloric acid containing about 20 to 32 wt.-% of HCl, a sulfuric acid containing about 50 to 100wt.-% of $H_2SO_4$ obtained from Claus exhaust gases containing $SO_2$, performing the reaction of the leaching residues with hydrochloric acid and sulfuric acid at a temperature between 60° C. and the boiling point, treating the solid matter separated from the acid solution with aqueous alkali solution to form an alkaline extract solution and an extraction residue, separating the alkaline extract solution from the extraction residue, combining the separated acid solution with the separated extract solution, and neutralizing and dewatering them.

Even in this embodiment of the method according to the invention, in which only the barium or strontium content of the leaching residues is utilized, the amount of residual material that has to be disposed of is even more greatly reduced, namely by as much as 90% by weight. Furthermore, good use is made of the Claus exhaust gas.

The method of the invention thus makes it possible in a technically advantageous and simple manner on the one hand to recycle most or even all of the residue produced by the leaching of barium sulfide or strontium sulfide, thereby reducing the amount that has to be disposed of, and on the other hand to make good use of waste sulfuric acid or $SO_2$ and/or exhaust gases containing hydrogen sulfide.

The following example is intended to further illustrate the method of the invention without limiting its scope.

EXAMPLE

Production of the Sulfuric Acid

Sulfur dioxide-containing exhaust gases from a Claus apparatus operated with hydrogen sulfide from the leaching of barium sulfide were oxidized catalytically over vanadium pentoxide, and the resulting sulfur trioxide was washed out with water. This produced a "wash acid" which contained about 60% by weight of sulfuric acid.

Decomposition of the Residue 3.5 tons of moist residue from barium sulfide leaching containing about 50% by weight water was mashed in a heated stirring tank with 1.8 tons of water. 620 kg of hydrochloric acid (concentration 32 wt.-% HCl) and 720 kg of the "wash acid" obtained in the preceding step (concentration 60 wt.-% $H_2SO_4$) were added with stirring. The hydrogen sulfide that formed was absorbed with barium sulfide lye in a gas washer.

After 1.5 hours of stirring at a temperature of 70° C., the suspension was filtered through a filter press. A 2.6 ton filter cake containing 28 wt.-% water was obtained. The filter cake was then washed with 2.8 $m^3$ of water. Then 170 kg of NaOH (concentration 30 wt.-%) were added, and the mixture was stirred for 2 hours at 90° C. The suspension was filtered through a filter press. The resulting filter cake (25 wt.-% water) contained 1.8 t of dry mass containing approximately 95.2 wt.-% $BaSO_4$, 1.5 wt.-% $SrSO_4$, 0.69 wt.-% $SiO_2$, 1.6 wt.-% $Fe_2O_3$, 0.78 wt.-% CaO.

The product corresponded to a highly concentrated heavy spar, and was used in the rotary kiln process for producing barium sulfide.

The collected filtrates from both filtration steps, combined with the respective wash waters were mixed in a stirring tank. A suspension resulted. By the addition of NaOH the suspension was adjusted to pH 7, and then dewatered in a filter press. 1.4 tons of moist filter cake containing 70 wt.-% of water were obtained. The filter cake was so solid that it could be worked with a spatula. The dry mass consisted mainly of iron(III) oxide, calcium oxide, silicon dioxide and aluminum oxide. This residue can be disposed of without difficulty.

In comparison with the residue introduced into the process, the amount of material to be disposed of was reduced by 76% with respect to the dry mass. Also, the "wash acid" was put to good use.

The example shows how advantageously the method of the invention can be integrated into the leaching process for the production of barium sulfide, in that the sulfur content of the exhaust gases is recycled into the process.

Of course, sulfuric acid from other sources can be added if, for example, not enough waste sulfuric acid or "wash acid" is available.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all variations falling within the ambit of the appended claims and equivalents thereof.

What is claimed is:

1. A method for processing the solid residue resulting from the reduction of heavy spar or celestine to form barium or strontium sulfide respectively, followed by aqueous extracting said sulfides to separate said sulfides from the solid residue, comprising reacting the solid residue with hydrochloric acid in at least the amount stoichiometrically required to dissolve calcium and iron contained in the residue and with sulfuric acid in an amount that is 1.02 and 1.1 times stoichiometrically required amount to convert the barium and strontium values contained in said residue to barium and/or strontium sulfate and to form an acid solution and a solid comprising said barium and/or strontium sulfate, and separating the acid solution from the solid, wherein a waste sulfuric acid or a sulfuric acid obtained by the treatment of exhaust gases containing $SO_2$ and/or $H_2S$ is used as the sulfuric acid.

2. A method according to claim 1, wherein a sulfuric acid is used which has been obtained by the treatment of $SO_2$- and/or $H_2S$ containing exhaust gases from a Claus apparatus.

3. A method according to claim 1, wherein said sulfuric acid contains at least 40 wt.-% of $H_2SO_4$.

4. A method according to claim 3, wherein said sulfuric acid contains from 50 to 100 wt.-% of $H_2SO_4$.

5. A method according to claim 1, wherein said hydrochloric acid contains at least 15 wt.-% of HCl.

6. A method according to claim 5, wherein said hydrochloric acid contains from 20 to 32 wt.-% of HCl.

7. A method according to claim 1, wherein said reacting step is carried out at a temperature of from 60° C. to the boiling temperature of the reaction mixture.

8. A method according to claim 7, wherein said reacting step is carried out at a temperature of from 65° C. to 100° C.

9. A method according to claim 1, wherein the solid separated from the acid solution is decomposed with aqueous alkali solution to form an alkaline extract solution and an extraction residue, and the alkaline extract solution is separated from the extraction residue.

10. A method according to claim 9, wherein said aqueous alkali solution contains sodium hydroxide in an amount of from 1 wt.-% to the saturation limit.

11. A method according to claim 10, wherein said aqueous alkali solution contains sodium hydroxide in an amount of from 15 to 50 wt.-%.

12. A method according to claim 9, wherein said decomposition of the separated solid with aqueous alkali solution is carried out at a temperature of from greater than 50° C. up to the boiling point of the reaction mixture.

13. A method according to claim 9, wherein the separated acid solution is combined with the separated alkaline extract solution.

* * * * *